Dec. 16, 1969   E. OEHMSEN   3,483,879
PLASTIC COVERED BUILDING STRUCTURE
Filed Aug. 19, 1968   2 Sheets-Sheet 1

INVENTOR.
ERICH OEHMSEN
BY Albert F Krouman
ATTORNEY

Dec. 16, 1969  E. OEHMSEN  3,483,879
PLASTIC COVERED BUILDING STRUCTURE
Filed Aug. 19, 1968  2 Sheets-Sheet 2
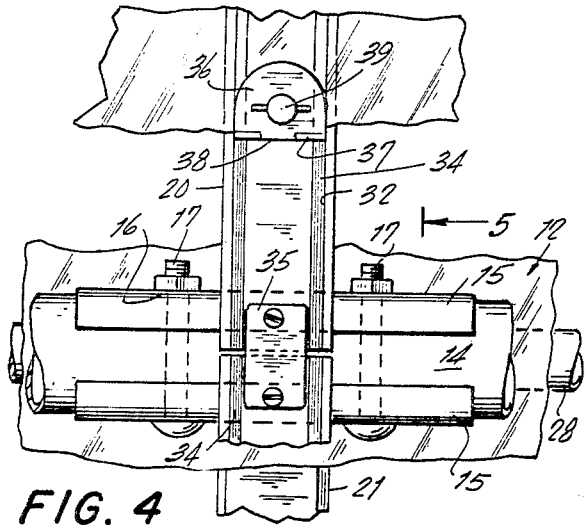
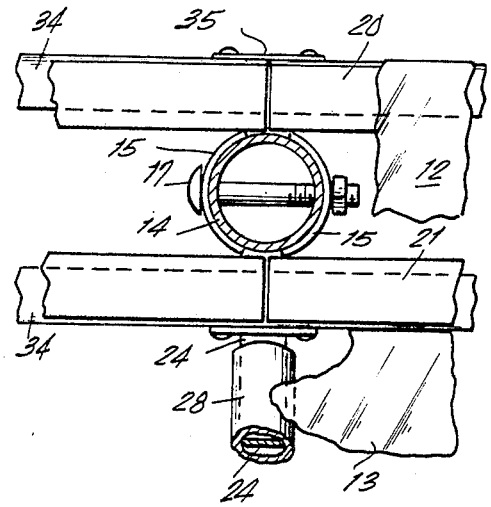
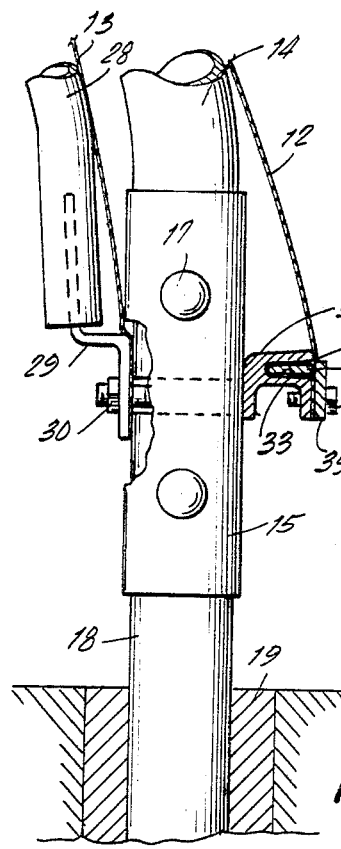
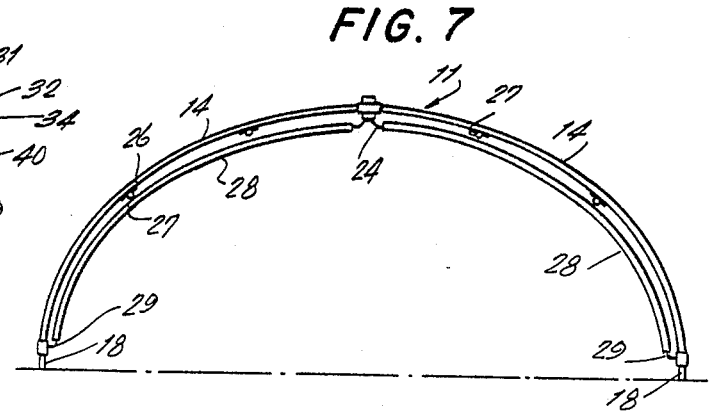
INVENTOR.
ERICH OEHMSEN
BY
ATTORNEY

United States Patent Office 3,483,879
Patented Dec. 16, 1969

3,483,879
PLASTIC COVERED BUILDING STRUCTURE
Erich Oehmsen, Valley Stream, N.Y.
(55C Saratoga Blvd., Island Park, N.Y. 11558)
Filed Aug. 19, 1968, Ser. No. 753,591
Int. Cl. E04b 1/347; A47h 13/01; E06b 3/54
U.S. Cl. 135—1                                        6 Claims

ABSTRACT OF THE DISCLOSURE

A plastic covered structure in which a rigid metal frame supports an inner and outer layer of plastic in spaced relationship. The plastic covering sheet material is secured to the frame by means of elongated members having longitudinal recess and complementary keys received therein. The plastic sheet is wedged between the keys and the recess eliminating the need for nailing or other plastic piercing securing devices.

Background of the invention

Building structures of a semi-permanent nature, covered by plastic sheet are well known. Such structures are particularly useful on farms and nurseries where their inexpensive nature and light transmitting properties make them particularly useful as greenhouses. The structures can be assembled and disassembled easily and provide a year round shelter capable of being moved from place to place when necessary. However, in order to reduce the cost of such structures, relatively thin plastic sheeting is used. The plastic often tears while the structure is being erected. In addition, small tears or holes which are made in the plastic while it is being secured to the rigid supporting structure are quickly enlarged by the effects of wind and the weight of snow. Accordingly, it is extremely desirable in erecting such structures to secure the plastic to the supporting frame without tearing it or punching holes in it. Metal frames which are favored for their ability to withstand the elements increase the difficulty of securing the plastic sheeting without tearing it.

In one prior art construction, for example, the plastic is nailed to wooden supports on the metal frame of the greenhouse. The use of nails in this manner initiates punctures which quickly become larger to the ultimate destruction of the plastic cover.

It is therefore among one of the principal objects of the present invention to provide a structure having a plastic covering in which the plastic securing means will not reduce the useful life of the structure.

Summary of the invention

In the present invention there is provided a greenhouse structure or the like in which a metal frame has secured thereto spaced inner and outer layers of plastic. The plastic securing means consists of elongated recessed members and elongated keys received therein. The plastic sheet is clamped in place between the recesses and the wedges to secure inner and outer plastic sheets to the frame. The lower margins of the outer sheet are also locked in place by a recess and key arrangement.

Description of the drawings

The invention will be more fully understood by reference to the accompanying drawings in which similar parts have been given the same reference numeral, and in which:

FIGURE 4 is a fragmentary plan view taken along line 4—4 of FIGURE 3 in the direction of the arrows, FIGURE 5 is a fragmentary sectional view taken along line 5—5 of FIGURE 4 in the direction of the arrows, FIGURE 6 is a view partly in section and partly broken away taken along line 6—6 of FIGURE 1, and showing the plastic sheet anchoring structure of the invention, FIGURE 7 is a view in front elevation of the skeletal frame of the greenhouse, before the plastic covering has been applied and anchored thereto.

Description of the preferred embodiment

Figure 1:
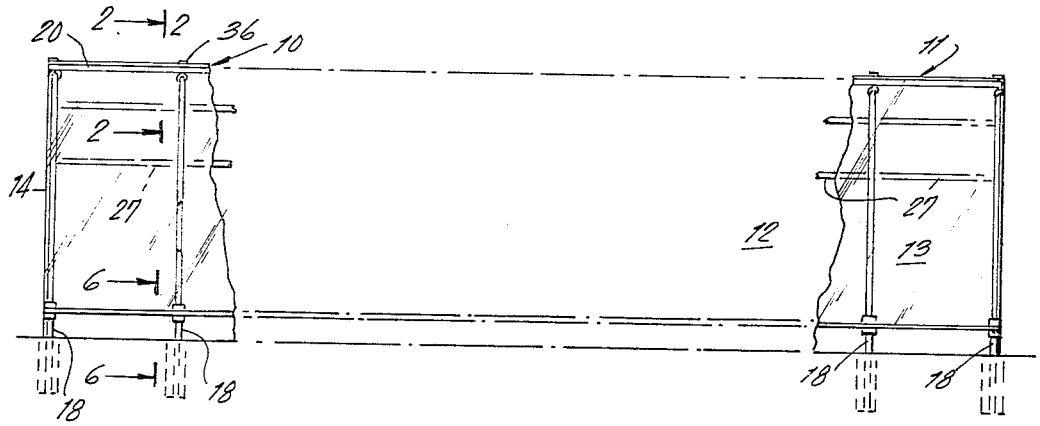
FIGURE 1 is a fragmentary view in side elevation of a plastic covered greenhouse constructed according to the present invention.

Referring now the drawings; 10 indicates a greenhouse structure of generally semi-circular cross-sectional shape. The greenhouse 10 consists of a rigid frame 11 which supports an outer and an inner covering 12, 13, of sheet plastic material such as vinyl or polyethylene. The greenhouse frame consists of a series of rafters 14 formed of tubular material such as pipe which is bent into the substantially arcuate shape required to form the structure as shown in FIGURE 7. The rafters 14 are coupled at the ridge of the building by means of splice plates 15 shown in FIGURES 2, 3, and 4. The splice plates 15 consist of elongated members of arcuate cross-section having bolt receiving openings 16 therein which line up with complementary bores in the ends of the rafters 14. A carriage bolt or the like 17 is slipped through the splice plates 15 and the rafter bores as shown in FIGURE 4 to secure the assembly together.

The lower end of the rafters 14 are coupled to upstanding pipe members 18 which are either driven into the ground or mounted within a concrete base 19 in the well known manner. Splice plates 15 are used at this juncture for coupling purposes. The rafters 14 and pipe 18 are each bored to receive the carriage bolts 17 in the manner hereinabove described to effect the attachment of the rafters to the pipes 18.

Figure 2:
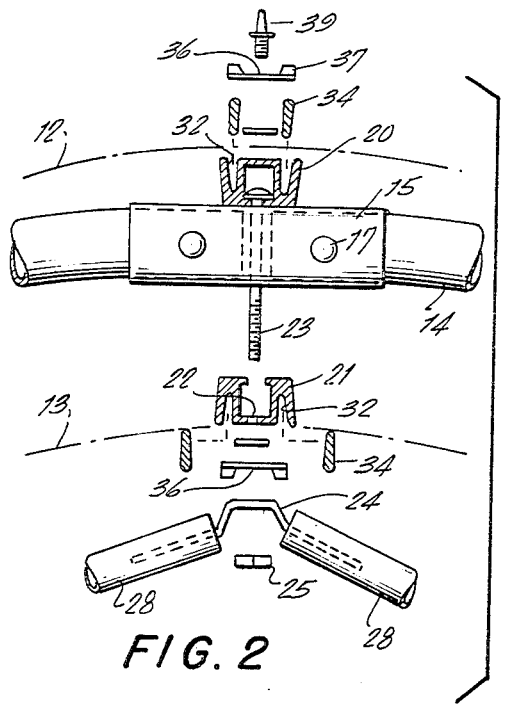
FIGURE 2 is a somewhat exploded, enlarged view partly in section taken along line 2—2 of FIGURE 1, looking in the direction of the arrows, and showing the plastic sheet locking members of the invention.
Figure 3:
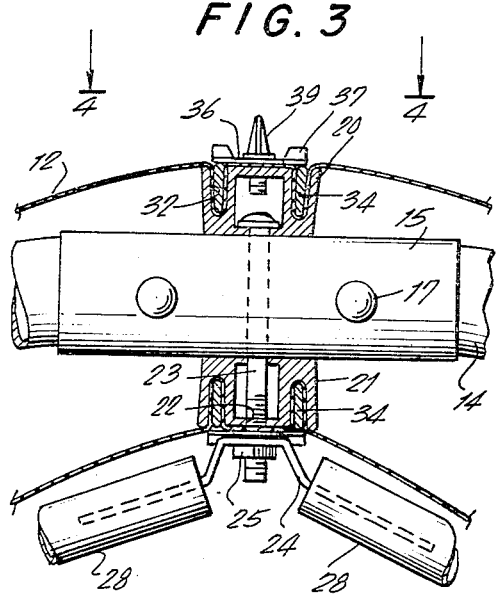
FIGURE 3 is a view similar to FIGURE 2 showing the parts assembled.

The structure 10 is longitudinally supported and the rafters 14 maintained in spaced relationship from one another by elongated extrusions 20, 21, which are bolted to the top of the rafters 14 to form a ridge as shown in FIGURES 1 and 3. The top extrusion 20 is provided with parallel spaced recesses 32 formed with tapering inner walls as shown in FIGURES 2 and 3. The bottom extrusion 21 is identical in shape with the top extrusion 20 except that it is transversely bored as indicated at 22 to receive the carriage bolt 23. As shown in FIGURE 3, the carriage bolt 23 slips between the rafters 14 and secures the extrusions 20, 21 to the top of the rafters.

A liner ridge bracket 24 is slipped over the end of the bolt 23 before the nut 25 is secured thereto. The purpose of the liner ridge bracket 24 will hereinafter be more fully described.

The rafters 14 are also provided with a series of spaced clasps 26 to receive longitudinally disposed purlins 27. The purlins 27 provide longitudinal bracing for the structure and support the outer plastic sheeting between the rafters.

In order to provide insulating properties to the structure, it is desirable to have a cover made of spaced sheets of plastic with a dead air space in-between. For this purpose a liner bow 28 formed of tubular material such as metal tubing or the like and generally curved to conform to the inner radius of the rafters, is secured at one end by slipping over the liner ridge bracket 24, as shown in FIGURE 3, and at its other end by a base bracket 29 best shown in FIGURE 6. The base bracket 29 is secured by means of a carriage bolt 30 which is slipped between the bottom of the rafter 14 and the pipe 18 and between the splice plates 15 which couple the rafters and the pipe together. The bolt 30 also serves to secure a side rail extrusion 31 to the outside of the supporting structure as shown in FIGURE 6. The side rail extrusion 31 is provided with a longitudinal recess 32 having tapered walls 33 therein to receive an elongated key 34.

From the foregoing the assembly of the structure will be apparent as follows:

The supporting pipes 18 are anchored in the ground in spaced relationship in the manner shown in FIGURE 1.

Two rafter members 14 are assembled on the ground and coupled together by means of the splice plates 15. The assembled rafter members are then raised one by one into their upright position and secured to the pipes 18 by means of the lower splice plates 15 as shown in FIGURE 6. The extrusions 20, 21 are then secured along the ridge of the rafters 14 by means of the bolts 23 in the manner shown in FIGURE 3. Where the extrusions are not long enough to extend the length of the building, they are secured in abutting relationship by means of the space plates 35 shown in FIGURE 4. The extrusions 20, 21 are also provided with a series of winged washers 36 having upstanding portions 37 thereon extending upwardly from a chordal portion 38 of the said washers 36. The washers 36 are secured to the outer surface of the extrusions 20, 21 by means of small screws 39.

The purlins 27 are next secured in place by means of the clasps 26 whereupon the structure is ready for the application of the outer sheet of plastic.

The outer sheet of plastic 12 may be of a width large enough to cover the entire structure or, as is much more common, large enough to cover one-half of the structure. In either event, the plastic 12 is laid across the longitudinal recesses 32 in the top of the extrusion 20 and the elongated key 34 forced downwardly to squeeze the plastic 12 between the key 34 and the walls of the recess 32. The tapered configuration of the walls 32 serve to wedge the plastic within the groove without tearing it. Where the plastic is wide enough to cover only one-half of the structure, the winged washers 36 are rotated so that the chordal side thereof clears the groove or recess 32 within the extrusion 20. Once the key 34 has been pushed into place, the winged washer 36 is rotated 180 degrees to hold it in place and permit the attachment of the opposite section of plastic. The roll of plastic 12 is usually supported horizontally during this process and rolled along the top of the structure as the work progresses. At the end of this step, the exterior plastic covering 12 will be supported at its upper margin in the outer extrusion 20 and will hang down over the structure and overlie the side rail extrusion 31.

The bottom of the plastic 12 is secured to the side rail extrusion 31 by means of the elongated key 34 which is held in place by means of the washer 39 and the screw 40. Here again, the plastic 12 is secured in place without piercing the covering by nails or fastening devices. The inner plastic covering member 13 is now attached to the structure by slipping the upper margin thereof within the elongated recess 32 of the lower extrusion 21 and securing it in place by the elongated key 34 in the manner shown in FIGURE 3. Here again, the winged washer 36 is employed so that first one side of the covering may be applied and thereafter the other. It will be understood, that after the second section of plastic has been placed within the recess 32 and the key 34 applied, the winged washer 36 will be rotated 90 degrees to the position shown in FIGURE 4 at which junction both wedges 34 are held in place and prevented from being pulled out by the weight of the plastic.

With the inner covering of plastic 13 secured along its upper margin, the bows 28 are suspended between the liner ridge bracket 24 and the base bracket 29 as shown in FIGURE 7. Since there is no stress on the inner sheet of plastic 13 the bottom of the roll of plastic can be permitted to rest upon the bottom base bracket 29 or squeezed between the base bracket and the rafters 14 in the manner shown in FIGURE 6.

Any suitable closure (not shown) such as plywood, boards, plastic or the like can be employed to cover the open ends of the structure thus described.

From the foregoing it will be seen that there has been provided a plastic covered structure such as a greenhouse, which is easy to erect, durable, inexpensive, light in weight, and capable of provided insulating characteristics despite the extremely thin nature of the covering material.

Having thus fully described the invention, what is claimed as new and desired to be secured by Letters of Patent of the United States is:

1. A double walled plastic sheet covered structure comprising a series of spaced bowed tubular rafter members, a series of horizontally disposed spaced purlins secured to the rafters, a ridge assembly having top and bottom outer faces secured to the tops of the rafters and extending for the length of the structure, spaced parallel elongated recesses in the outer faces of the ridge assembly, an elongated key receivable within the said recesses, washer members having a chordal portion thereon rotatably carried on the outer faces of the ridge assembly and adapted to overlie the keys and at least one covering members in the form of a plastic sheet, secured along one of its margins between the walls of the elongated recess and the elongated keys and overlying the rafters and purlins to enclose the structure.

2. A structure according to claim 1 in which the ridge assembly comprises an upper and a lower elongated metal extrusion bolted together and through bolted to the rafters.

3. A structure according to claim 2 in which a liner bow is carried beneath each of the rafters spaced therefrom and a second plastic sheet is secured along its upper margins between the key and recess of the lower extrusion and supported by the said liner bows in spaced relationship to the first plastic sheet.

4. A structure according to claim 1 in which the elongated recesses are inwardly tapered and the keys have a cross sectional wedge shape to conform to said recess shape.

5. A structure according to claim 2 in which said washer members comprise a series of spaced winged washer members having a chordal portion on the periphery thereof are rotatably secured to the outer faces of the elongated extrusions overlying the elongated recesses.

6. A structure according to claim 3 in which the first plastic sheet is secured along its lower margins by a side rail said rail comprising an elongated metal member, an elongated recess in said member to receive the margin of the plastic sheet, an elongated key receivable within the recess and adapted to overlie the plastic sheet and clamping means to secure the key within the recess.

References Cited

UNITED STATES PATENTS

| | | | |
|---|---|---|---|
| 2,999,507 | 9/1961 | Glass | 135—1 |
| 3,080,875 | 3/1963 | Bartlett | 135—1 |
| 3,415,260 | 12/1968 | Hall | 135—1 |
| 2,827,138 | 3/1958 | Roy | 52—63 X |

OTHER REFERENCES

"Gro-Mor" by Lord and Burnham, Adv. 287, 8/1960, of Irvington, N.Y.

JOHN E. MURTAGH, Primary Examiner

U.S. Cl. X.R.

52—86, 481; 160—395